July 3, 1951 — O. H. DICKE — 2,558,935
SUSTAINED POWER ELECTRIC CLOCK
Filed Sept. 21, 1944
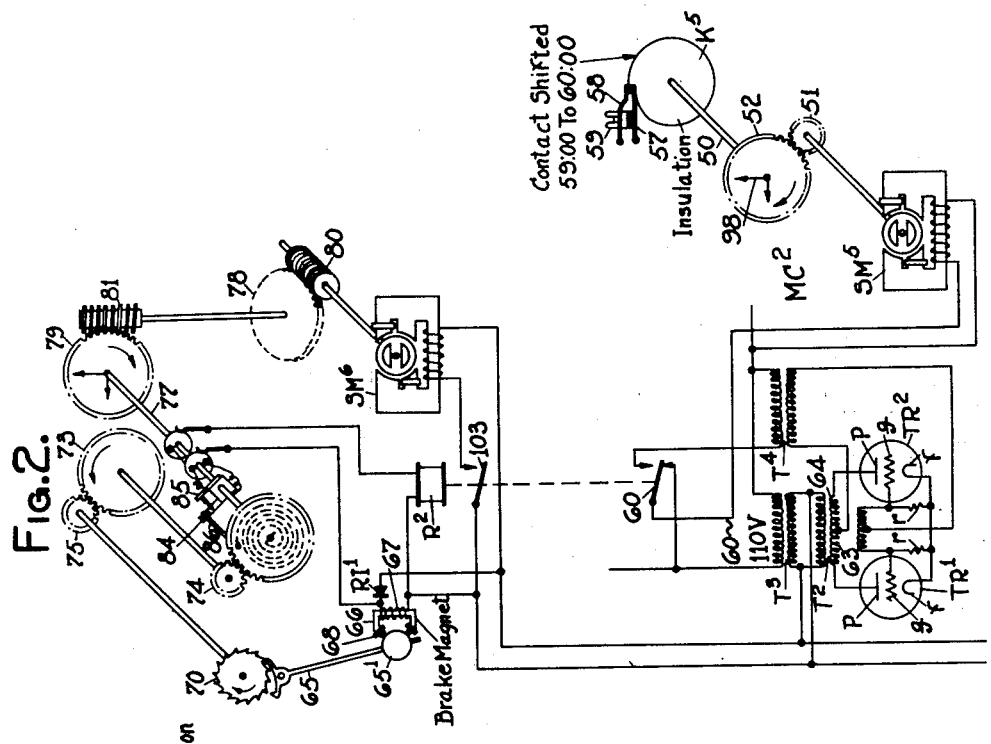
Inventor
O. H. Dicke Patented July 3, 1951

2,558,935

UNITED STATES PATENT OFFICE 2,558,935

SUSTAINED POWER ELECTRIC CLOCK

Oscar H. Dicke, Rochester, N. Y., assignor to International Business Machines Corporation, New York, N. Y., a corporation of New York Application September 21, 1944, Serial No. 555,110

11 Claims. (Cl. 58—26)

This application is a continuing application in part of prior applications, and as to Fig. 1 constitutes a continuing application of Ser. No. 472,698 filed January 18, 1943, now Patent No. 2,490,340, granted December 6, 1949, which is a division of application, Ser. No. 245,700, filed December 14, 1938, now Patent No. 2,313,466, granted on March 9, 1943; and as to Fig. 2 constitutes a continuing application of Ser. No. 239,538, filed November 8, 1938, now Patent No. 2,359,973, granted October 10, 1944. The invention relates to sustained power electric clocks and more particularly to an electric clock of this type in which a normally-at-rest time piece measures the duration of a current cessation and either during such cessation or thereafter corrects the electric clock.

One object of the present invention resides in the provision of a master clock in which joint action of escapement mechanisms and a synchronous motor driven by alternating current of regulated frequency correctly manifest the passing of time and in which the master clock time shaft is advanced in accordance with current cycle passage during the presence of alternating current.

Another object of the present invention resides in the provision of a novel master clock in which one element of the master clock used for operating clock correcting contacts is always in substantial synchronism with secondary clocks in spite of the fact that the secondary clocks are at rest during alternating current cessation, such current being derived from a commercial power system having its frequency regulated to correctly manifest passing of time.

Other objects of the present invention reside in the provision of a master clock in which joint action of escapement mechanisms and a synchronous motor driven by alternating current of regulated frequency correctly manifest the passing of time and in which the master clock time shaft is advanced in accordance with current cycle passage during the presence of alternating current.

Other objects, purposes and characteristics and their advantages will appear from the following description when taken in connection with the drawings and from the drawing themselves in which:

Fig. 1 shows a form of the invention in which the master clock comprises a time shaft driven during current presence by a synchronous motor and during current cessation by a normally braked escapement clock;

Fig. 2 is a modified form of the invention in which an alternating current two-speed synchronous motor master clock is employed which master clock after each power failure is corrected by a normally stationary escapement clock; and Fig. 3 illustrates a modification of Fig. 1.

In accordance with the present invention it is proposed to employ or have available a commercial alternating current power distributing system delivering current of regulated frequency, that is, current having its average frequency regulated to correctly manifest time by cycle passage or summation. In such case the master clock is of a construction whereby it is corrected (Fig. 2) so as to run in synchronism with alternating current cycle passage, or by correcting a master electric clock in accordance with the duration of a current cessation whereby it is corrected during each current cessation.

*Fig. 1 structure.*—Referring to Fig. 1, in this form of the invention the master clock includes a rotatable gear box containing reduction gearing including pinions 192, 194 and gears 193 and 195, the gear box $G^1$ being preferably oil filled. This reduction gearing preferably includes sufficient friction or some worm gears, so that if the gear box is rotated and the synchronous motor whose rotor 195 projects from the gear box is not energized this rotor will be rotated at the same speed as the gear box, that is, will be stationary with respect to the gear box.

Referring to Fig. 1 the gear box $G^1$ is pivotally mounted in stationary frames $F^1$ and $F^2$. To one end of the gear box is fastened a gear $140^1$ which is preferably of slightly larger diameter than the gear box diameter. Concentric with and mounted within one of the bearings of the gear box is a motor shaft $141^1$ on which is mounted the rotor 196 of a synchronous motor $SM^{10}$. Concentric with and mounted within the other bearing of the gear box $G^1$ is a minute shaft (1 R. P. H.) designated $142^1$ for the master clock. This minute shaft carries an insulating cam $K^{12}$. This cam $K^{12}$ controls contacts 160, 161 and 162 for secondary clock correcting purposes. The gear ratio of the pinion 192 and gear 193 and the gear ratio of pinion 194 and gear 195 within the gear box $G^1$ is such that if the gear box $G^1$ shown in Fig. 1 is held stationary and the synchronous motor $SM^{10}$ is rotated at synchronous speed by current from the regulated frequency current source, the minute shaft $142^1$ will rotate clockwise at a speed of one revolution per hour (1 R. P. H.).

The gear $140^1$ of the master clock $MC^1$ is at times, namely, during power failures, driven by any suitable escapement clock including preferably a pendulum 144 having a magnetic bob 144ᵃ, an escape wheel 145, a driven pinion 146, and gear reduction means conventionally indicated by the pinions 146 and 148, and the gears 140¹ and 147. This escapement clock also includes a main spring 150 anchored to a hand winding ratchet wheel 151 driving the gear 147. This ratchet wheel 151 is kept from unwinding by the ratchet pawl 152 and may be hand wound by the key 153. Suitable electric motor winding means such as referred to in my prior applications above referred to may be used if desired. The pendulum 144 is normally, that is when alternating current is available, held at rest, or is braked, by the electro-magnet 154—155 having its projecting legs surrounded individually by slugs or short circuited rings 156 of low resistance. The winding 155 of this electro-magnet is normally energized by direct current derived through the medium of a rectifier RI² from the regulated alternating current source. The slugs or bucking coils 156 and the rectifier RI² are used to render the electro-magnet slow releasing. This slow releasing feature is employed to cause the escapement clock mechanism to drive the gear box G¹ about its pivot for a slightly shorter time than the actual current cessation in order that the shaft 142¹ may accurately indicate standard time after a current cessation. In this connection it is desired to point out that a synchronous motor of the kind contemplated, and in fact any commercial synchronous motor, will coast for a time so that it will not be stationary during the entire current cessation. It has been observed that such a synchronous motor will, if deenergized for one second, be tardy only to the extent of about a half second. The slugs 156 are of such resistance that a current cessation of say two seconds will cause the two pole rotor 196 to coast thirty revolutions (one-half second) and will cause the escapement clock to operate for one and one-half seconds.

*Operation Fig. 1.*—Normally, that is when alternating current of regulated frequency is available, the alternating current from the regulated source energizes the brake magnet 154—155 and holds the escapement portion of the master clock MC¹ at rest. At the same time the synchronous motor SM¹⁰ drives the shaft 142¹ and the cam K¹² at 1 R. P. H. through the medium of the gear reduction 192—195 within the then stationary gear box G¹.

When a current cessation occurs the electro-magnet 154—156 is deenergized to an extent to release after a delay of about one-half second. This delay is due to the slugs 156 on this magnet and the fact that the alternating current has been converted into direct current by the rectifier RI². The escapement clock including the pendulum 144 now operates and measures the actual time the synchronous motor SM¹⁰ is not operating. That is, it operates the shaft 142¹ at a speed of one revolution per hour (1 R. P. H.) for substantially the duration of the current cessation. When the current cessation ceases the current in the electro-magnet 154—155 builds up very quickly so that the pendulum 144 is held by the electro-magnet the first time it approaches this magnet after the current cessation has ceased. The synchronous motor SM¹⁰ also gets up to its synchronous speed very quickly. The difference between the rotation of motor SM¹⁰ gained when a current cessation starts and that lost during acceleration of this motor is about one-half second and this portion of time is lost by the slow-releasing feature of the electro-magnet 154—156. The condenser N associated with electro-magnet 154—156 is used to dampen out the direct current ripples produced by the rectifier RI², so that the direct current flowing in the coil 155 is substantially continuous.

Referring for a moment to the rotatable mechanism housing G¹ shown in Fig. 1 instead of having the rotor 196 of the motor SM¹⁰, and located on shaft 141¹, projecting from the housing and having it driven by its stationary stator, as shown in Fig. 1, the stator may, if desired, be located entirely within the housing G¹ and rotated therewith when the housing is rotated. In this case slip rings 201 and 202 (Fig. 3) engaged by brushes 203 and 204, respectively, are preferably connected to and insulated from this housing G¹. This latter construction would permit a smaller air-gap to be used and would permit the rotor 196 to be contained within the oil-contained housing G¹. Such a construction has been illustrated in Fig. 3 of the drawings. The slip rings 201 and 202 shown are obviously connected to the two ends of the winding of stator SM¹⁰ so that this winding may be energized in any position of the housing G¹. The gear ratio in the housing of Fig. 3 will be the same as the gear ratio of the Fig. 1 construction because in each case the housing G¹ will be at rest while the synchronous motor SM¹⁰ is operating. This gear ratio is such that with housing G¹ stationary and with the synchronous motor SM¹⁰ operating at synchronous speed the clock hands, only one having been shown, will correctly manifest the passing of time. In the Fig. 3 structure the housing is rotatable through the medium of pinion 148 at the desired speed when the synchronous motor SM¹⁰ is deenergized. In case of a secondary clock of the construction shown in Fig. 3, the housing G¹ is rotated very fast to cause correction of indication by the clock hands. Also, the clock hands will rotate in the same direction irrespective of whether they are driven by the synchronous motor or by rotation of the housing.

*Fig. 2 structure.*—In the structure of Fig. 2 the functional results are substantially the same as those accomplished by the structure of Fig. 1. The structure, however, is different in that the master clock MC² is a synchronous motor operated clock with escapement clock governing means for causing the synchronous motor clock to run at double speed after each current cessation for a time equal to the time of such current cessation, as is also true of all secondary clocks controlled thereby. The double speed is obtained by applying a double frequency.

Referring to Fig. 2, the master clock MC² includes a synchronous motor SM⁵ which when operated by normal frequency of preferably 60 cycles will drive the hour shaft 50 at 1 R. P. H. through a gear reduction including pinion 51 and gear 52. This shaft 50 drives a contact operating cam K⁵ operating and controlling contacts 57—58—59. This synchronous motor SM⁵ is, during the presence of alternating current of regulated frequency derived from the source AC, supplied with either normal frequency alternating current through transformer T³ or is operated by alternating current of double frequency derived from transformer T⁴ as determined by the condition of energization of relay R² through its contact 60. The transformer T⁴ is supplied with pulsating current of 120 cycle frequency through the medium of a frequency doubler, comprising thyratrons TR¹ and TR². These thyratrons are really gas filled grid initiated or grid controlled rectifiers, each having a grid $g$, a filament $f$ and a plate $p$. The grids are each provided with a grid leak $r$ and are activated from the secondary winding 63 of the transformer $T^2$. The filaments $f$ are also energized from a secondary winding (not shown) of this same transformer. The various constants are preferably so chosen that rectification of substantially the second half of each half, namely, the second half of the positive and the second half of the negative wave of each cycle of current is rectified. This is done in order that the rectified waves, derived from the plate circuits including secondary winding 64 of transformer $T^2$, and which currents flow in the same direction in the primary winding of the transformer $T^4$ may be separated by a time period substantially equal to their duration, so that alternating current of 120 cycle and of substantial quantity will be delivered at the terminals of the secondary winding of this transformer $T^4$. In order to get the rectifying action for each wave of the alternating current to be started by its thyratron at or near the middle of the current wave it may be necessary to employ suitable phase shifting apparatus. Such phase shifting apparatus is employed for properly phasing the grid circuit for tube $TR^1$ in the prior application of Hoppe Ser. No. 120,421, filed January 13, 1937, now Patent No. 2,131,735, dated October 4, 1938, to which reference may be had. This phase shifting apparatus comprises an inductance $PL^2$ and a resistance $PR^2$ of the Hoppe patent connected in series across the secondary winding of a transformer, with the potential difference between an intermediate point of said secondary winding and the junction between said inductance $PL^2$ and said resistance $PR^2$ as the phase displaced electro-motive force to activate the grid of the thyratron.

This master clock $MC^2$ includes an escapement clock mechanism and a synchronous motor clock mechanism in combination. This escapement clock is shown conventionally as a pendulum clock, comprising a pendulum 65, having a soft iron magnetic bob $65^1$, normally held at rest by the direct current electro-magnet 66—67 energized by direct current derived from the same source of regulated frequency current through the medium of rectifier $RI^1$. This electro-magnet has each leg surrounded by a ring or slug of copper or other suitable conducting material in order to make the direct current magnet slow releasing. This electro-magnet is made slow releasing in order that the escapement clock may measure a slightly smaller time than the actual time of a current cessation and in so doing will cause the relay $R^2$ to be energized a correspondingly shorter time in order that the synchronous motor $SM^5$ will be energized by double frequency alternating current a slightly shorter period than the actual duration of the current cessation. This is done to remove the error that would otherwise creep in due to the coasting of the motor $SM^5$ during the current cessation. It has been found that if a small synchronous motor of the type contemplated is energized for one second it will rotate an extent equal to one and one-half seconds. That is, if it is two pole it will rotate 90 revolutions instead of 60. This pendulum controls an escape wheel 70 which is driven by a main spring 71 through the medium of gears 72 and 73 and pinions 74 and 75.

This main spring 71 is electrically wound through the medium of shaft 77, worm-wheels 78 and 79 and worms 80 and 81 by the synchronous winding motors $SM^6$. This worm reduction gearing including worm-wheels 78 and 79 and worms 80 and 81 has a rotation ratio such that when the spring winding motor $SM^6$ operates at synchronous speed from the alternating current regulated source it will turn the shaft 77 exactly one revolution in one hour. In other words, if a current cessation has occurred, upon return of power the contacts 84—85, which are normally held open by the pin 86 being engaged by the contact 84 and holding it away from the contact 85, and which are closed by any power cessation of less than one hour, will be opened when the power has been restored for a time equal to the extent of the duration of such cessation minus about a half second. This half second difference is due to the fact that the escapement ran a half second less time than the extent of the power cessation, and this was by reason of the slow acting release of the brake magnet due to its slug 68. The rectifier $RI^1$ is also included in series in the energizing circuit for the relay $R^2$ to render the relay quiet.

*Operation Fig. 2.*—Let us now assume that at the 30 minute position of the master clock $MC^2$ a current cessation takes place. This cessation of current deenergizes the brake magnet 66—67 causing it to release the pendulum 65 after about one half second delay. Since the synchronous motor $SM^5$ will coast for an equal period of time the escapement clock will still measure the amount of time the electric synchronous motor part of the master clock will have lost upon return of the alternating current power. This operation of the escapement portion of the master clock causes the main spring 71 to run partly down, causing the pin 86 to disengage from the contact spring 84 thereby causing the contacts 84—85 to close. The relay $R^2$ remains deenergized until power returns which we will assume to be at the forty minute position of the master clock. This return of power will cause locking of the pendulum 65 against the brake magnet 66—67 and will cause picking up of the relay $R^2$. Picking up of the contact 60 of the relay $R^2$ will cause the synchronous motor part of the master clock $MC^2$ to run at double speed, because the synchronous motor $SM^5$ is energized by double frequency current. The shaft 50 will, therefore, run at double its normal speed and this will continue for a time equal to the duration of the current cessation and immediately following such current cessation. This is true for upon the expiration of such a period of time the contacts 84—85 of the master clock will be opened, resulting in deenergization and dropping of the relay $R^2$, stopping of the winding motor $SM^6$ and the return to normal speed operation of the synchronous motor $SM^5$. The shaft 50 will, therefore, reflect exactly correct time.

As heretofore pointed out all the electrical apparatus stops during a current cessation and the escapement portion of the master clock $MC^2$ operates during each current cessation.

Having thus shown and described several embodiments of clocks exemplifying my invention, it is desired to be understood that the particular arrangements, speed ratios, frequency ratios and the like have been selected to facilitate description of the invention and have not been illustrated as illustrations of the specific constructions preferably employed in practicing the invention. It should, therefore, be understood that various modifications and adaptations may be made to facilitate application to the problems encountered in practicing the invention without departing from the spirit of the invention except as demanded by the scope of the appended claims.

What I claim as new is:

1. In a clock of the sustained power type, the combination with mechanical time measuring mechanism; a source of stored energy for driving said mechanism; a source of alternating current having its frequency regulated to correctly manifest the passing of time; electro-responsive means energized from said source of alternating current for holding said mechanism at rest so long as no current cessation occurs; a housing mounted for rotation about an axis and having a shaft projecting therefrom in such axis; reduction gearing in said housing; synchronous motor means for driving said shaft through the medium of said gearing without rotating said housing so long as no current cessation occurs; and a reduction gearing operated by said time measuring mechanism for rotating said housing and in turn said shaft, in the same direction and at substantially the same speed as when driven by said synchronous motor, during a current cessation; whereby said shaft by its rotation accurately manifests the passing of time so long as no current cessation occurs and substantially accurately manifests the passing of time during a current cessation; and time indicating means driven by said shaft; whereby said time indicating means substantially correctly indicates time irrespective of one or more current cessations.

2. In a clock of the sustained power type, the combination with a source of alternating current having its frequency regulated to correctly manifest the passing of time, mechanical time measuring mechanism, a source of stored energy for driving said mechanism, an electro-magnet for holding said mechanism at rest so long as said magnet is active, means including rectifying means and an energizing circuit for rendering said electro-magnet active by energizing it with direct current derived from said source of alternating current through the medium of said rectifying means, delay means for maintaining said electro-magnetic field in said magnet for a time after said energizing circuit has been broken, a time shaft, a gear train, a synchronous motor means for driving said time shaft through the medium of said gear train so long as no alternating current cessation occurs, and reduction gearing operated by said time measuring mechanism for rotating said time shaft during a current cessation in the same direction and at substantially the same speed as when driven by said synchronous motor, the time during which said electro-magnet is maintained active by said delay means after a current cessation starts being substantially equal to the time measured during the coasting of the synchronous motor means following such current cessation.

3. In a clock, the combination with a housing having a time shaft rotatable with respect to said housing projecting therefrom and with the housing rotatable about the axis of said time shaft, a gear train in said housing for rotating said time shaft with respect to said housing, a synchronous motor in said housing for driving said gear train, slip connections for feeding energy from an alternating current source to said motor, and clock mechanism for rotating said housing controlled by alternating current from said source to prevent rotation of said housing so long as alternating current is available and allowing such rotation of said housing only during a current cessation.

4. In a sustained power electric clock, a source of alternating current of regulated frequency regulated to accurately manifest the passing of time which source may at times fail, time measuring means operated from a local source of energy, means including a synchronous motor for measuring the passing of time in accordance with cycle passage during the flow of current from said source of alternating current, electro-magnetic means for holding said time measuring means at rest including an electro-magnet having a short-circuited turn thereon and a rectifier for supplying rectified current from said alternating current source to such electro-magnet, planetary gearing and a shaft driven through the medium of said planetary gearing by both said time measuring means and said synchronous motor to rotate said shaft in a particular direction, said electro-magnetic means being so designed that the delay of its release is substantially equal to the time manifested by the coasting of said synchronous motor after being de-energized due to a current cessation.

5. In a sustained power electric clock of the type described; the combination with a local source of energy; time measuring means operated from said local source of energy; a source of alternating current having its frequency regulated so that its average frequency accurately manifests the passing of time; a rectifier; an electro-magnet energized by current from said alternating current source after it has been rectified by said rectifier for when active holding said time measuring means at rest and for releasing it after a cessation of said alternating current occurs; a synchronous motor for measuring the passing of time in accordance with the frequency of the alternating current from said alternating current source; means associated with said electro-magnet including a closed circuit conductor linking said electro-magnet for delaying its release for a predetermined time substantially equal to the time lapse manifested by the coasting of said motor following a current cessation; whereby said time measuring means substantially accurately measures the duration of a current cessation minus the time manifested by coasting of said motor; and means including a shaft said synchronous motor and means governed in accordance with the extent of operation of said time measuring means for rotating such shaft in accordance with the time alternating current is supplied, the time manifested by coasting of said motor and the time measured by the operation of said time measuring means.

6. Apparatus for measuring the passing of time comprising; a time piece of the oscillatory type including an oscillatory member for measuring the passing of time and including a local source of energy for keeping said member oscillating so long as it is not restrained; a source of alternating current of regulated frequency regulated so that its average frequency accurately manifests the passing of time; an electro-magnet magnetically associated with said member to restrain said member by holding it in an extreme position when said magnet is energized; a rectifier connected for receiving energy from said alternating current source and rectifying it into direct current; a circuit including said rectifier for applying the direct current so derived to said electro-magnet so long as alternating current is available; a synchronous motor; a closed circuit current conductor of low resistance linking said electro-magnet to delay the release of said electro-magnet for a time substantially equal to the time manifested by the coasting of said motor following a current cessation; and means including said synchronous motor and said time piece for summing up the time alternating current is supplied, the time manifested by coasting of said motor and the time measured by operation of said time piece.

7. In a sustained power electric clock, a time shaft, a gear train, a source of alternating current of regulated frequency, a synchronous motor energized from said source for driving said time shaft through the medium of said gear train so as to correctly manifest the passing of time so long as no current cessation occurs, a second gear train, clock mechanism including said second gear train and an oscillatory member for when operating driving said time shaft, an electro-magnet for when energized holding said oscillatory member at rest in one extreme position, a rectifier, circuit means including said rectifier for energizing said electro-magnet by direct current derived from said alternating current source to hold said oscillating member at rest at least so long as no alternating current cessation occurs, a closed circuit conductor of low resistance linking the magnetic path of said electro-magnet to maintain flux in said electro-magnet for a short time following an alternating current cessation to delay its release for a time equal to that manifested by the coasting of said synchronous motor after a current cessation, whereby since both said synchronous motor and said clock mechanism drive said time shaft and since the delay in starting of said clock mechanism is compensated for by coasting of said motor said time shaft correctly manifests the passing of time irrespective of one or more cessations of alternating current.

8. A time indicating device comprising, a housing mounted for rotation about an axis, a time shaft projecting from said housing and mounted for rotation with respect to said housing about said axis, time indicating means driven by said time shaft, reduction gearing in said housing for when operated rotating said time shaft with respect to said housing, a synchronous motor for operating said reduction gearing and said time shaft without rotating said housing, a gear train, time measuring means for rotating said housing and in turn said time shaft in the same direction through the medium of said gear train, whereby said time shaft may be rotated in the same direction by either said time measuring means or by said synchronous motor or both, a source of alternating current of regulated frequency for operating said synchronous motor, and means for rendering said time measuring means effective only during a current cessation of said alternating current.

9. In a time indicating device, the combination with a housing having a time shaft rotatable with respect to said housing projecting therefrom and with the housing rotatable about the axis of said time shaft, a gear train in said housing for rotating said time shaft with respect to said housing, a synchronous motor in said housing for driving said gear train, means for conducting alternating current to said motor during rotation and non-rotation of said housing, other time measuring means for rotating said housing and said time shaft in the same direction, and means for holding said other time measuring means inactive so long as alternating current is supplied to said motor.

10. In a time measuring device, the combination with a housing having a time shaft rotatable with respect to said housing projecting therefrom and with the housing rotatable about the axis of said time shaft, a gear train in said housing for rotating said time shaft with respect to said housing, a synchronous motor external of said housing for driving said gear train through the medium of a second shaft coaxial with said time shaft, other time measuring means for rotating said housing and said time shaft therewith in the same direction, and means for holding said other time measuring means inactive so long as alternating current is supplied to said motor.

11. In a time indicating device, the combination with a housing having a time shaft rotatable with respect to said housing projecting therefrom and with the housing rotatable about the axis of said time shaft, a gear train in said housing for rotating said time shaft with respect to said housing, a synchronous motor for driving said gear train and in turn rotating said time shaft, other time measuring means for rotating said housing and said time shaft therewith in the same direction, and means for holding said other time measuring means inactive so long as alternating current is supplied to said motor.

OSCAR H. DICKE.

REFERENCES CITED

The following references are of record in the file of this patent:

UNITED STATES PATENTS

| Number | Name | Date |
| --- | --- | --- |
| 499,737 | Howland | June 20, 1893 |
| 1,495,936 | Warren | May 27, 1924 |
| 1,792,512 | Siegmund | Feb. 17, 1931 |
| 1,995,726 | Warren | Mar. 26, 1935 |
| 2,191,976 | Taliaferro | Feb. 17, 1940 |

FOREIGN PATENTS

| Number | Country | Date |
| --- | --- | --- |
| 358,673 | Great Britain | Oct. 15, 1931 |
| 729,947 | France | May 3, 1932 |

OTHER REFERENCES

Underhill on Magnets, paragraphs 58 and 66, first edition, published by McGraw-Hill Book Co., Inc., 370 Seventh Ave., New York City. A copy of the above text book may be found in Division 48 of the Patent Office.